United States Patent
Suzuki et al.

(10) Patent No.: US 6,494,809 B1
(45) Date of Patent: Dec. 17, 2002

(54) ENGINE CONTROL APPARATUS AND ENGINE CONTROL METHOD

(75) Inventors: Takashi Suzuki, Susono (JP); Toshifumi Takaoka, Susono (JP); Naoto Suzuki, Fujinomiya (JP); Daimon Okada, Ikeda (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 17 days.

(21) Appl. No.: 09/694,009

(22) Filed: Oct. 23, 2000

(30) Foreign Application Priority Data

Nov. 19, 1999 (JP) .......................................... 11-329889

(51) Int. Cl.$^7$ .............................................. B60K 41/04
(52) U.S. Cl. ...................... 477/107; 701/111; 701/112
(58) Field of Search ............................. 477/107, 3, 111, 477/110; 701/112, 113

(56) References Cited

U.S. PATENT DOCUMENTS

| | | | |
|---|---|---|---|
| 4,165,795 A | * 8/1979 | Lynch et al. | 180/65.2 |
| 5,566,774 A | * 10/1996 | Yoshida | 180/309 |
| 5,653,659 A | * 8/1997 | Kunibe et al. | 477/110 |
| 5,993,351 A | * 11/1999 | Deguchi et al. | 477/174 |
| 6,007,443 A | * 12/1999 | Onimaru et al. | 180/65.2 |
| 6,086,506 A | * 7/2000 | Petersmann et al. | 477/45 |
| 6,093,974 A | * 7/2000 | Tabata et al. | 180/65.2 |
| 6,135,914 A | * 10/2000 | Yamaguchi et al. | 180/65.2 |
| 6,176,807 B1 | * 1/2001 | Oba et al. | 180/65.2 |
| 6,190,284 B1 | * 2/2001 | Kuroda et al. | 477/107 |
| 6,209,672 B1 | * 4/2001 | Severinsky | 180/65.2 |
| 6,253,127 B1 | * 6/2001 | Itoyama et al. | 701/22 |
| 6,258,008 B1 | * 7/2001 | Tabata et al. | 477/107 |
| 6,269,895 B1 | * 8/2001 | Tanuguchi et al. | 180/65.1 |
| 6,275,004 B1 | * 8/2001 | Tamai et al. | 320/116 |

FOREIGN PATENT DOCUMENTS

| | | |
|---|---|---|
| JP | A-8-61105 | 3/1996 |
| JP | A-9-71138 | 3/1997 |
| JP | A-9-154205 | 6/1997 |

* cited by examiner

Primary Examiner—Rodney H. Bonck
Assistant Examiner—David D. Le
(74) Attorney, Agent, or Firm—Oliff & Berridge, PLC

(57) ABSTRACT

In a vehicular engine control apparatus, the engine is stopped upon fulfillment of a predetermined stopping condition even in the case where the shift position of the vehicle is a running position, and the engine is restarted afterwards upon fulfillment of a predetermined starting condition. The predetermined starting condition is switched depending on whether the detected shift position is a running position or a non-running position. This reduces a sense of incongruity or unpleasantness caused to the driver in stopping and starting an engine during operation of a vehicle and thereby improves driveability of the vehicle.

15 Claims, 6 Drawing Sheets

ENGINE CONTROL APPARATUS AND ENGINE CONTROL METHOD

INCORPORATION BY REFERENCE

The disclosure of Japanese Patent Application No. 11-329889 filed on Nov. 19, 1999, including the specification, drawings and abstract is incorporated herein by reference in its entirety.

BACKGROUND OF THE INVENTION

1. Field of the Invention

The invention relates to an engine stopping/starting control apparatus and an engine stopping/starting control method employed in a vehicle in which the engine is stopped upon fulfillment of a predetermined stopping condition even if a shift position is a running position and in which the engine is started upon fulfillment of a predetermined starting condition.

2. Description of Related Art

In order to improve fuel consumption of a motor vehicle in response to a demand for conservation of resources, an apparatus which performs stopping/starting control of an engine during operation has been proposed. This apparatus is often employed in a so-called hybrid vehicle and the like. As will be described hereinafter, this apparatus temporarily stops the engine in a running state of the vehicle and thereafter restarts the engine.

FIG. 6 shows an example of a hybrid system 1 for a hybrid vehicle. The hybrid system 1 has an engine 2, a motor generator 6 coupled to a crank shaft of the engine 2, a transmission 4 coupled to an output shaft of the motor generator 6, a battery 8, and an inverter 10. The battery 8 and the inverter 10 exchange power with the motor generator 6.

The hybrid system 1 is a parallel hybrid system in which wheels can be driven by one or both of the engine 2 and the motor generator 6. If the wheels are driven only by the engine 2, the motor generator 6 functions as a dynamo. In this case, the vehicle can travel while charging the battery 8 through the inverter 10.

A stopping/starting control apparatus for the engine 2 employed in the hybrid system 1 is mainly realized through control performed by a controller 12. Even in the case where the shift position of the vehicle is a running position, the engine 2 is stopped upon fulfillment of a predetermined stopping condition and then restarted upon fulfillment of a predetermined starting condition. The controller 12 minimizes the operating period of the engine 2, and operates the engine 2 in its most efficient state, thereby improving fuel consumption and reducing concentrations of emission substances in comparison with a vehicle which is only equipped with an internal combustion engine. In addition, the apparatus eliminates restrictions on a traveling range or the trouble of external charging as in an electric vehicle whose wheels are driven only by a motor.

Conditions for stopping and restarting the engine 2 are determined, for example, from the sum of an electrical load (based on the driving of the motor generator 6, operation of an air-conditioner and the like) and a work by the wheels calculated from a depression amount of an accelerator pedal, a vehicle speed and the like (the sum will hereinafter be referred to as required power). If the required power has dropped below a threshold set as the stopping condition, the engine 2 is stopped. If the required power has exceeded a threshold set as the starting condition, the engine 2 is restarted.

As described above, if the engine 2 is stopped or started upon fulfillment of predetermined stopping/starting conditions even in the case where the shift position of the vehicle is a running position, the following problems may be caused.

For example, if the shift position of the vehicle is a running position and if the vehicle travels by being driven only by the motor generator 6 with the engine 2 out of operation, the engine 2 is restarted by the stopping/starting control apparatus upon fulfillment of a predetermined starting condition. Thus, oscillation of the vehicle resulting from the starting operation may adversely affect the driveability. Further, since a driving force of the engine 2 is added to a driving force of the motor generator 6, an acceleration shock (or a deceleration shock) may be sensed by the driver. Especially when the vehicle travels at a constant or low speed, the driver may keenly feel a sense of incongruity.

Furthermore, in the case where the vehicle speed is equal to zero (the vehicle is stopped) with the shift position being a running position, namely, where the brake has been depressed with the accelerator released, if the engine is restarted, the driver may sensitively respond to oscillation of the engine and feel a sense of incongruity. Further, a shock transmitted to the wheels in a stopped state of the vehicle may cause unpleasantness to the driver.

SUMMARY OF THE INVENTION

It is one object of the invention to mitigate to the utmost a sense of incongruity or unpleasantness caused to the driver by restarting an engine and to thereby improve the driveability of the vehicle.

In order to achieve the above-stated object, an engine control apparatus of one aspect of the invention includes a shift position detector that detects a shift position of a vehicle, and a controller. The controller stops the engine upon fulfillment of a stopping condition, and restarts the engine afterwards upon fulfillment of a first starting condition if the detected shift position is a running position and upon fulfillment of a second starting condition if the detected shift position is a non-running position.

In the aforementioned aspect of the invention, the first starting condition may make it more difficult to restart the engine than the second starting condition.

According to the aforementioned aspect of the invention, if the shift position is a running position, the engine is more unlikely to be started smoothly in comparison with the case where the shift position is a non-running position. Thus, the number of times for starting the engine in running positions can be minimized, and a sense of incongruity caused to the driver can be mitigated. That is, if the shift position is a running position, and if a driving force of the engine is directly reflected as a driving force for causing the vehicle to travel, the driver tends to feel unpleasantness. Thus, in such a state, a best possible attempt is made to avoid the starting of the engine. In a neutral position or the like in which the starting of the engine is not reflected as a driving force for the wheels by releasing a clutch or the like, it becomes relatively easy to start the engine.

Further, when the engine is started on the basis of the first starting condition, the controller may set a torque change rate of driven wheels of the vehicle to a predetermined value or less.

This mitigates an abrupt rise in torque of the driven wheels in restarting the engine, namely, an engine starting shock. Consequently, a sense of incongruity caused to the driver is further attenuated.

BRIEF DESCRIPTION OF THE DRAWINGS

Various exemplary embodiments of the invention will be described with reference to the accompanying drawings, in which like numerals are used to represent like elements and wherein.

DETAILED DESCRIPTION OF PREFERRED EMBODIMENTS

Hereinafter, an engine stopping/starting control apparatus in accordance with the invention will be described in detail with reference to the drawings.

Figure 1:
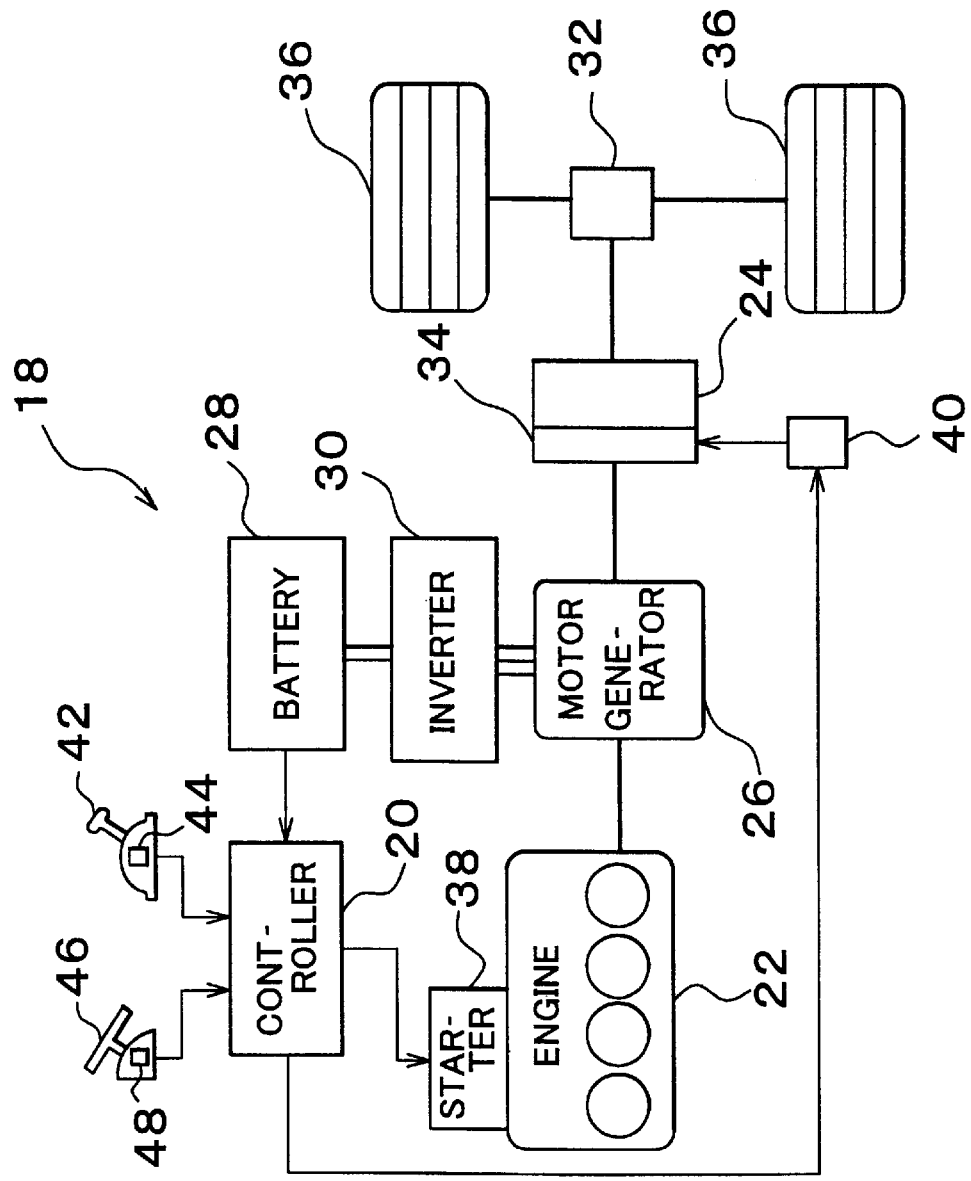
FIG. 1 is a block diagram of the structure of a hybrid system to which an engine stopping/starting control apparatus in accordance with a first embodiment of the invention is applied.

FIG. 1 shows a case where a stopping/starting control apparatus in accordance with a first embodiment of the invention is applied to a hybrid vehicle.

Figure 6:
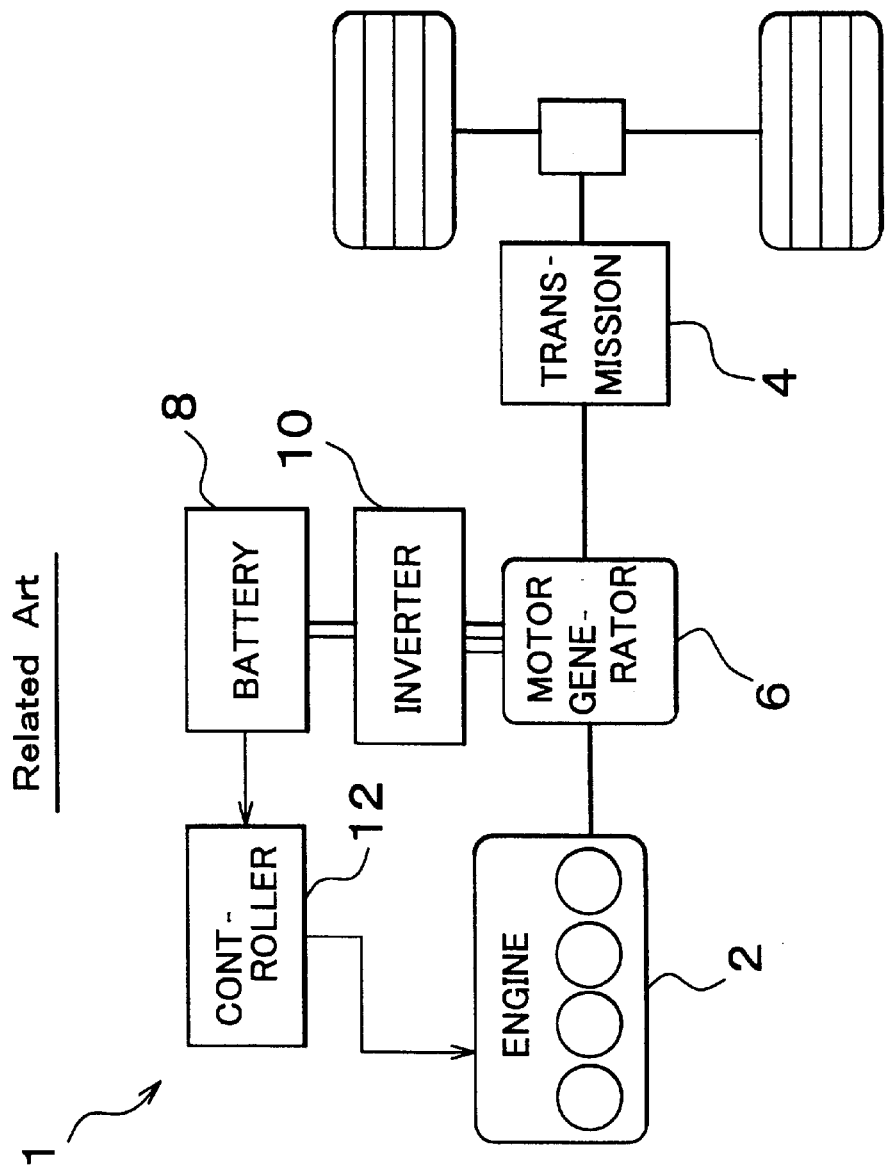
FIG. 6 is a block diagram of the structure of a hybrid system to which an engine stopping/starting control apparatus in accordance with the related art is applied.

The basic structure of a hybrid system 18 employed in this vehicle is substantially the same as that of a hybrid system 1 shown in FIG. 6. That is, the hybrid system 18 has an engine 22, a motor generator 26 coupled to a crank shaft of the engine 22, a transmission 24 coupled to an output shaft of the motor generator 26 through an electromagnetic clutch 34, wheels 36 coupled to an output shaft of the transmission 24 through a differential gear 32, and a battery 28, which functions as accumulation/discharge means connected to the motor generator 26 through an inverter 30.

The motor generator 26 functions not only as a dynamo for regeneration but also as a motor for driving the wheels 36. The motor generator 26 is coupled to a rotational shaft which transmits power to the output shaft of the transmission 24 and the differential gear 32. When functioning as a dynamo, the motor generator 26 regenerates coasting or braking energy transmitted from the side of the wheels 36 in a coasting or braking state of the vehicle. Also, when an amount of charge in the battery 28 is insufficient, the motor generator 26 generates electricity by being driven by an engine output, thus contributing to the charging of the battery 28. When functioning as a motor, the motor generator 26 rotates due to a power supplied from the battery 28 and drives the wheels 36 by means of its rotational force, so that the vehicle travels. In this embodiment, when the vehicle is stopped in a running position, restarting operation thereof is performed by smoothening a rising curve by means of the motor generator 26 (as will be described later).

By switching a switching element, the inverter 30 converts an alternating current generated by the motor generator 26 into a direct current and charges the battery 28. Further, the inverter 30 converts a direct current from the battery 28 into an alternating current for driving a motor and drives the motor generator 26.

The transmission 24 is a continuously variable transmission (CVT). An electromagnetic clutch 34 adjacent thereto is controlled by a clutch control unit 40.

Next, stopping/starting control in this system will be described.

The engine stopping/starting control apparatus of the invention has a controller 20 shown in FIG. 1. A vehicle speed, a voltage value of the battery 28, shift position information obtained from a shift sensor 44 for detecting a shift position of a shift lever 42, an operating state of the engine 22, and information obtained from an accelerator sensor 48 for detecting a depression amount of an accelerator 46 and the like are input to the controller 20. Further, the controller 20 is designed to evince an elapsed time from a point when the shift position is switched to a backward position and an elapsed time from a point when the shift position is switched from the backward position to another position.

Based on these pieces of information, the controller 20 outputs control signals to the engine 22, the inverter 30, the clutch 34, a starter 38 and the clutch control unit 40. The controller 20 may be constructed of a microcomputer similar to an electronic control unit (ECU) for controlling respective structural components of the vehicle.

Hereinafter, the contents of control performed by the controller 20 will be described in detail.

Based on the input information, the controller 20 calculates a power S required for the engine 22. The required power S is calculated on the basis of the sum of a running work and an electric load. The running work is obtained from a current vehicle speed, an accelerator depression amount and the like. The electric load is obtained from a voltage value of the battery 28, a state of use of various electrical equipment such as an air-conditioner, and the like.

If a predetermined stopping condition is satisfied, the controller 20 stops the engine 22. In this case, the controller 20 may not only stop rotation of the crank shaft of the engine 22 but also idly rotate the engine 22 through a driving force or an inertial force of the motor by cutting or restricting the supply of fuel to the engine 22 (operation without combustion).

Figure 2:
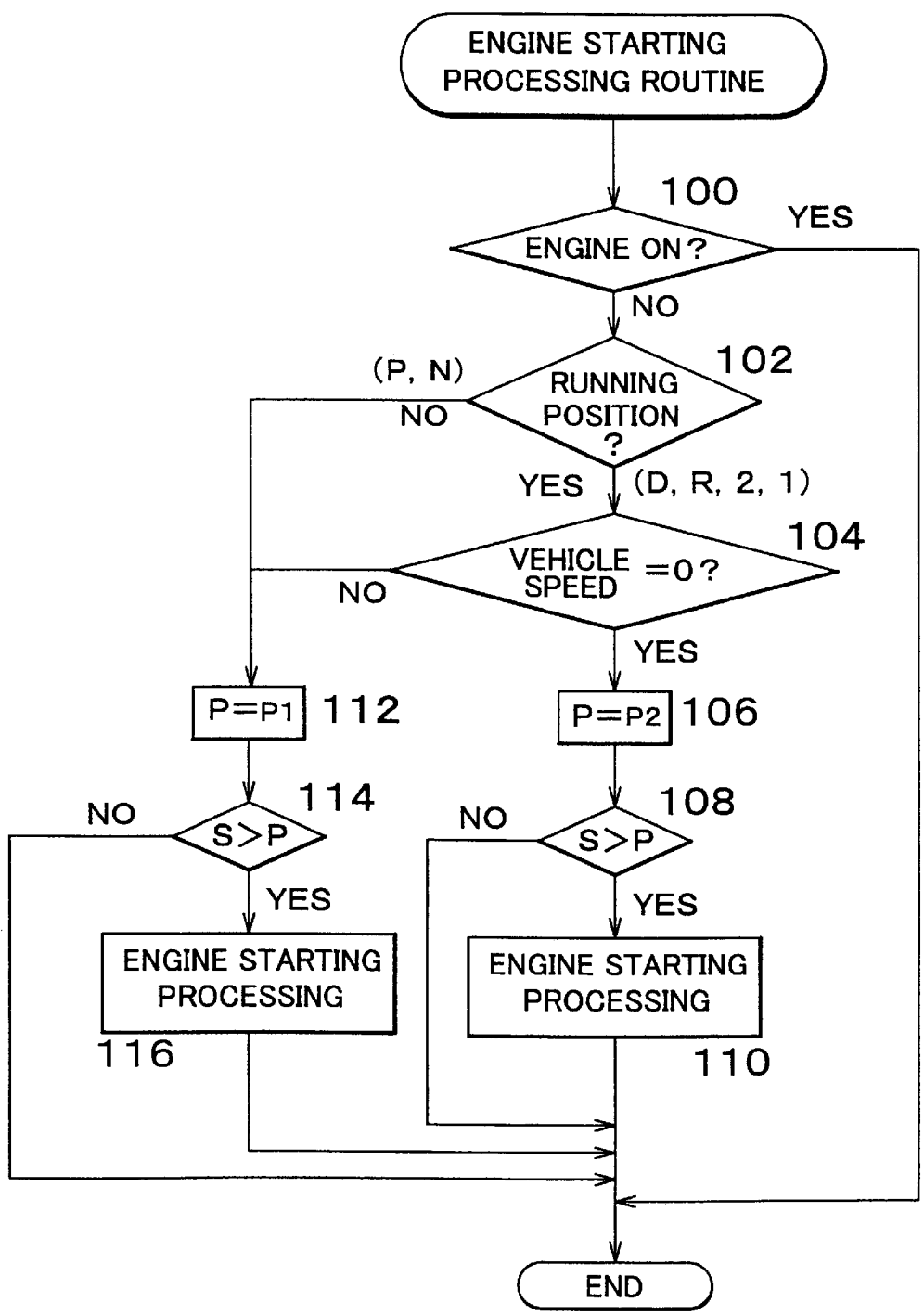
FIG. 2 is a flowchart showing a control operation of the stopping/starting control apparatus.

FIG. 2 shows an engine starting processing routine executed by the controller 20.

In starting the engine 22, it is detected first of all whether or not the engine 22 is in operation (STEP 100). If the engine 22 is out of operation (if the engine has been stopped), the operation proceeds to STEP 102. It is determined in STEP 102 whether or not the shift position of the vehicle is a running position (e.g. D, R, 2, 1). If the shift position of the vehicle is a running position, the operation proceeds to STEP 104. It is determined in STEP 104 whether or not the vehicle speed is equal to zero. If the vehicle speed is equal to zero, the operation proceeds to STEP 106 where the engine starting determination threshold P is set to P2. Then, the operation proceeds to STEP 108.

It is difficult to precisely detect that the vehicle speed is equal to zero. Therefore, in STEP 104, if the vehicle speed is in a range from zero to a predetermined value (which is close to zero), it is possible to determine "that the vehicle speed is equal to zero" (that the vehicle has been stopped).

In STEP 108, the engine power requirement S is compared with the engine starting determination threshold P. If the engine power requirement S is greater than the engine starting determination threshold P, the engine is started in STEP 110.

If the shift position is a non-running position (e.g. P, N) (if the result is negative in STEP 102), or if the vehicle speed is not equal to zero (if the result is negative in STEP 104), the operation proceeds to STEP 112. In STEP 112, the engine starting determination threshold P is set to P1. Then, the operation proceeds to STEP 114. In STEP 114, the engine power requirement S is compared with the engine starting determination threshold P. If the engine power requirement S is greater than the engine starting determination threshold P, the engine is started in STEP 116.

In this case, the threshold P2 in STEP 106 is set greater than the threshold P1 in STEP 112. During the determination of whether to start the engine 22, the case where the shift position is a non-running position (P, N) is assumed to be a normal state. Then, if the engine is started when "the shift position is a running position and the vehicle speed is equal to zero", the starting condition (the starting determination threshold P) is shifted (to P2) in a direction that makes it more difficult (i.e., less likely) to start the engine, in comparison with the normal state.

Consequently, in comparison with the case where the starting condition has not been shifted, the frequency of starting the engine in a running position decreases, whereas the frequency of starting the engine in a non-running position increases. If the shift position is a running position, the electromagnetic clutch 34 is connected, and thus, a shock caused by starting the engine is directly transmitted to the vehicle and makes the driver feel a sense of incongruity. For this reason, the frequency of starting the engine in a running position has been reduced. Further, in a hybrid system employing a hydraulic clutch, if the engine. 22 is stopped, a hydraulic pump for controlling the hydraulic clutch is also stopped. Therefore, even if the shift position is a running position, the clutch 34 is released automatically. If the engine 22 is driven (i.e., re-started) in this state, a hydraulic pressure is supplied to the hydraulic clutch to form a state capable of transmitting power. Thus, as a matter of course, the hydraulic clutch is engaged. As a result, an engine output causes a shock in the wheels 36 and makes the driver feel a sense of incongruity.

In the first embodiment of the invention, the frequency of starting the engine 22 in a running position is reduced. Thus, the driver feels a sense of incongruity less often, and consequently, the driveability improves.

Next, an engine starting processing (cranking) of the first embodiment will be described.

The controller 20 performs control differently depending on whether it is performing a normal engine starting processing in a non-running position (STEP 116) or it is performing an engine starting processing in a running position (STEP 110).

Figure 3:
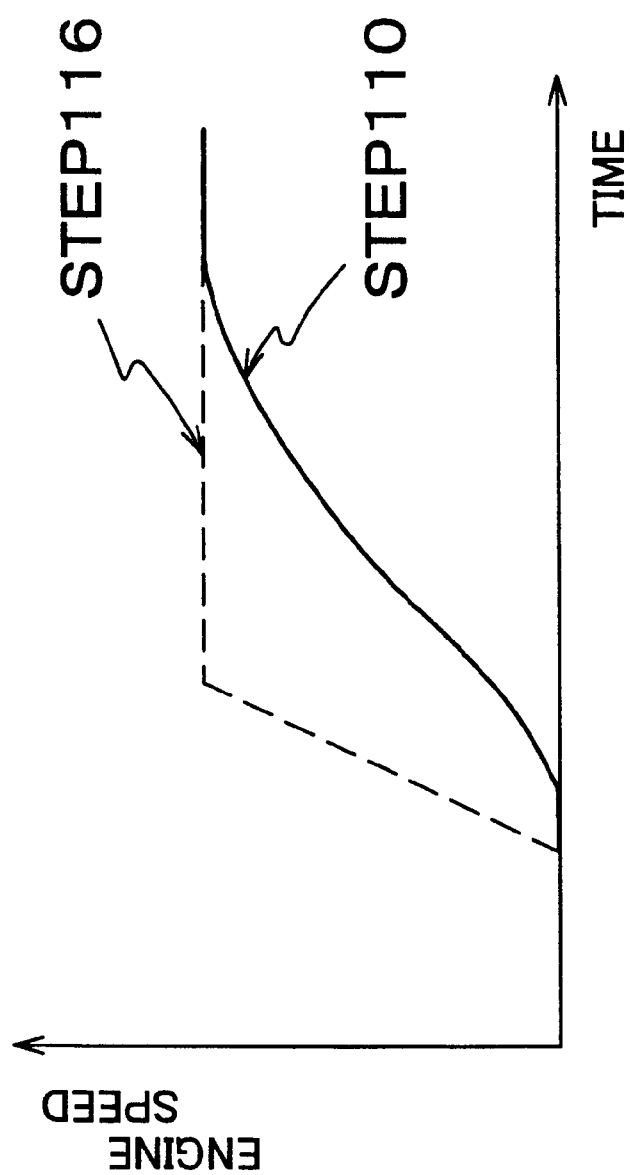
FIG. 3 is a diagram of a cranking pattern of the engine under control of the stopping/starting control apparatus.

In the case of the normal engine starting processing in STEP 116 (the starting processing in a non-running position), the motor generator 26 raises a rotational speed of the engine 22 as quickly as possible, and starts the engine 22 in a short period of time (see a dotted line in FIG. 3).

In the case of the engine starting processing in STEP 110 (the starting processing in a running position), the controller 20 controls the motor generator 26. Then, the engine 22 is started so that its rotational speed rises more gently (than usual) (see a solid line in FIG. 3). In this manner, the engine is gradually started, and consequently, the torque of the wheels (driven wheels) 36 rises gently. Thus, the shock given to the driver when starting the engine is significantly attenuated.

In addition to controlling the motor generator 26, the controller 20 may be designed to output a signal indicative of "starting the engine in a running position" to the clutch control unit 40, slowly engage the electromagnetic clutch 34, and make the rising of a torque of the wheels 36 gentle. This prevents the shock in starting the engine from being directly transmitted to the wheels 36.

Next, an engine stopping/starting control apparatus in accordance with a second embodiment of the invention will be described.

The structure of a hybrid system provided with the engine control apparatus is substantially the same as that of the first embodiment and thus will not be described. The following description will be limited to the contents of control performed by the controller 20.

Although the contents of control performed by the controller 20 of the second embodiment are substantially the same as those of the first embodiment, the following control is independently performed only in the case where the shift position is a backward position.

Figure 4:
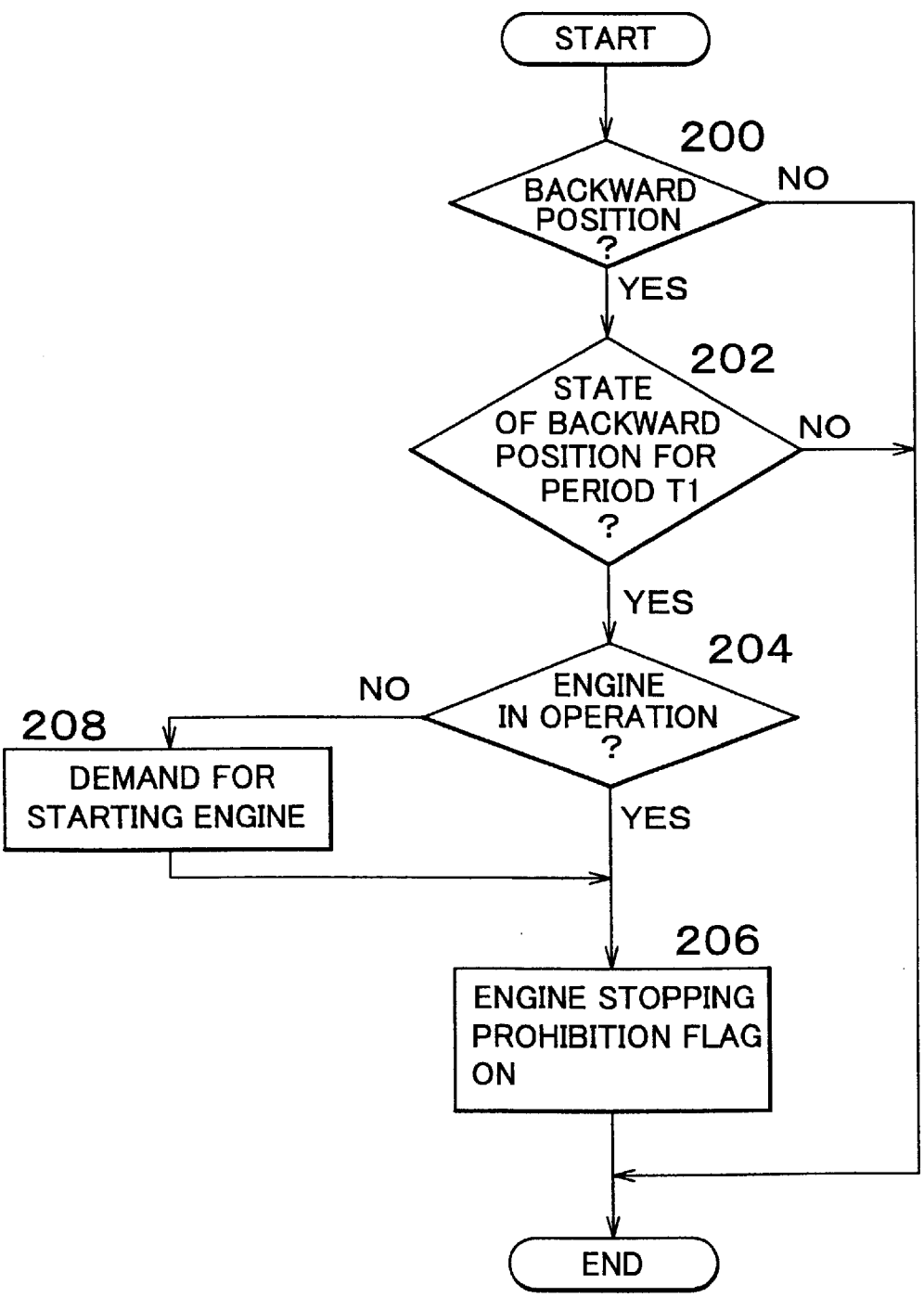
FIG. 4 is a flowchart showing engine starting/stopping prohibition control in an engine stopping/starting control apparatus in accordance with a second embodiment of the invention.

As shown in FIG. 4, if it is determined in STEP 200 that the shift position is a backward position, the operation proceeds to STEP 202. It is determined in STEP 202 whether or not a state of the backward position has continued for a period T1. If the state of the backward position has continued for the period T1, the operation proceeds to STEP 204. If the engine 22 is out of operation in STEP 204, it is started (STEP 208). If the engine 22 has already been started in STEP 204, the engine 22 is kept as it is and prohibited from being stopped later. That is, an engine stopping prohibition flag is turned on (STEP 206).

Thus, the starting of the engine can be prevented in the case where a shift change to a backward position has occurred just instantaneously. In the case where the vehicle actually travels backwards, that is, where the state of a backward position has continued for a predetermined period T1, the engine 22 is started at an early stage (if the engine 22 is already in operation, it remains as it is) so that the vehicle can stably travel backwards.

Further, once the engine 22 has been started, the stopping thereof is prohibited irrespective of the stopping/starting condition that has already been described. Therefore, when the vehicle travels backwards, operations of stopping and starting the engine 22 are not repeated. A running distance in the backward position is much smaller than an actual running distance of the vehicle. Therefore, even if operation of the engine 22 continues during backward movement of the vehicle, there is hardly a problem of actual deterioration of fuel consumption.

Next, a method of canceling the engine stopping prohibition flag shown in STEP 206 will be described with reference to FIG. 5.

The controller 20 determines in STEP 220 whether or not the engine stopping prohibition flag has been turned on. If the engine stopping prohibition flag has been turned on, the operation proceeds to STEP 222. In STEP 222, it is determined whether:

1) the shift position is a backward position (R);
2) the shift position is a parking position (P); or
3) the shift position is a running position other than R (N, D, 1, 2)

If the shift position is the backward position, operation of the engine needs to be continued. Therefore, this routine is terminated. If the shift position is the parking position, the engine can be stopped. Therefore, the engine stopping prohibition flag is canceled in STEP 224.

Further, if the shift position is a running position other than R, it is determined whether or not the state of a running position other than the backward position has continued for a period T2 (STEP 226). If it has continued for the predetermined period T2, the operation proceeds to STEP 224 where the engine stopping prohibition flag is canceled. If it has not continued for the predetermined period T2, the present routine is terminated.

This makes it possible to smoothly stop the engine in the parking position. Further, while the engine is in operation, under a circumstance where the backward position and the neutral position or a forward position are frequently switched from one to the other (e.g. when parking the vehicle), it is possible to prevent the engine from being started and stopped repeatedly. As a result, even when shift change operation is frequently performed to adjust the position of the vehicle, the engine stopping prohibition flag is not canceled easily. Therefore, the driver does not feel a sense of incongruity.

Figure 5:
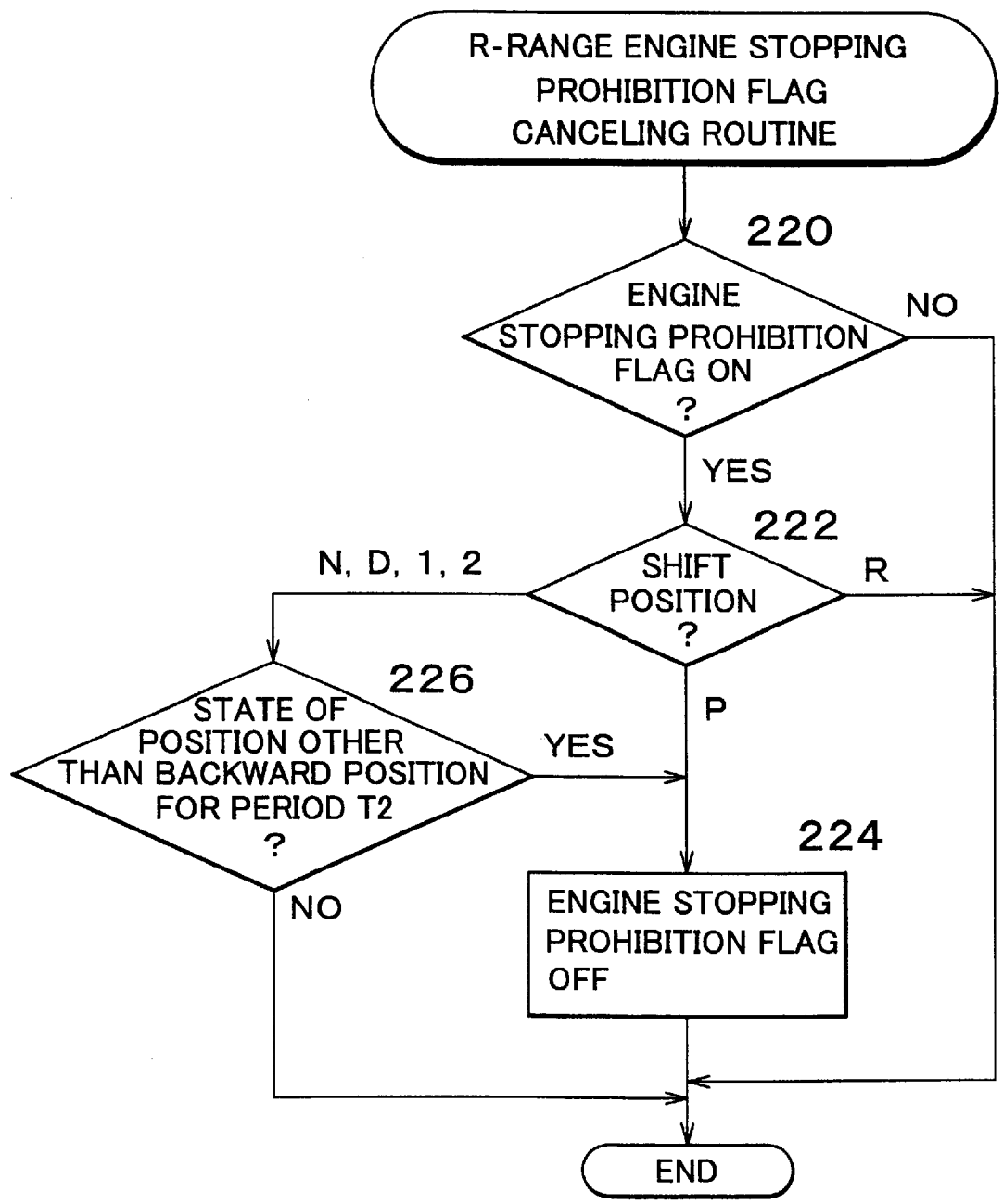
FIG. 5 is a flowchart showing operation of canceling engine stopping prohibition control in the stopping/starting control apparatus.

The control shown in FIG. 5 is performed in stopping the engine. Thus, it is preferable to set the period T2 to a relatively long period and cancel the engine stopping prohibition flag after the vehicle has definitely been shifted to a forward running state or the like.

According to the aforementioned stopping/starting control of the engine 22 by means of the controller 20 shown in FIGS. 4, 5, prohibition of a stopped state of the engine is maintained when the vehicle normally travels backwards (R). When the vehicle is stopped afterwards (P) or normally travels forward (N, D, 2, 1), it is permitted to stop the engine 22. Under a circumstance where shift change operation is frequently performed, the engine is unlikely to be stopped. Also, once the engine has been started, the frequency of stopping the engine is minimized so that the driver can smoothly drive the vehicle without feeling a sense of incongruity.

In the aforementioned embodiments, when the shift position is a running position, the starting condition may be shifted in a direction that makes it more difficult (i.e., less likely) to start the engine, irrespective of a vehicle speed.

According to the engine starting/stopping control apparatus of the invention, both the frequency and the magnitude of a shock caused in starting the engine when the shift position is a running position can be reduced. Consequently, it becomes possible to mitigate to the utmost a sense of incongruity or unpleasantness caused to the driver and improve driveability of the vehicle.

In the illustrated embodiment, the controller 20 is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations which are exemplary, other combinations and configurations, including more, less or only a single embodiment, are also within the spirit and scope of the invention.

What is claimed is:

1. An engine control apparatus comprising:
   a shift position detector that detects a shift position of a vehicle in which the engine is installed; and
   a controller that stops the engine upon fulfillment of a stopping condition and that restarts the engine afterwards 1) upon fulfillment of a first starting condition when the detected shift position is a running position and 2) upon fulfillment of a second starting condition when the detected shift position is a non-running position, wherein the first starting condition is established based on whether a power requirement exceeds a first starting determination threshold and the second starting condition is established based on whether the power requirement exceeds a second starting determination threshold, the first starting determination threshold is different from the second starting determination threshold so that the first starting condition makes it less likely to restart the engine than the second starting condition.

2. The apparatus according to claim 1, wherein:
   when the engine is started on the basis of the first starting condition, the controller sets a torque change rate of driven wheels of the vehicle to a value no greater than a predetermined value.

3. The apparatus according to claim 1, further comprising:
   a vehicle speed detector that detects a speed of the vehicle, wherein:
   the controller restarts the engine on the basis of the first starting condition when the detected shift position is a running position and the detected vehicle speed is equal to or smaller than a predetermined value.

4. The apparatus according to claim 3, wherein:
   when the engine is started on the basis of the first starting condition, the controller sets a torque change rate of driven wheels of the vehicle to a predetermined value or less.

5. The apparatus according to claim 1, wherein:
   the controller prohibits the engine from being stopped even upon fulfillment of the stopping condition, when the detected shift position is a backward position.

6. The apparatus according to claim 5, wherein the controller counts an elapsed time after the switching of the shift position to the backward position, and wherein the controller prohibits the engine from being stopped if the elapsed time is equal to or greater than a predetermined value.

7. The apparatus according to claim 1, wherein:
   the non-running position includes a neutral position and a parking position.

8. A control system for a hybrid vehicle comprising:
   the engine control apparatus according to claim 1.

9. An engine control method comprising:
   detecting a shift position of a vehicle in which the engine is installed;
   stopping the engine upon fulfillment of a stopping condition; and restarting the engine 1) upon fulfillment of a first starting condition after the stopping of the engine when the detected shift position is a running position and 2) upon fulfillment of a second starting condition after the stopping of the engine when the detected shift position is a non-running position, wherein the first starting condition is established based on whether a power requirement exceeds a first starting determination threshold and the second starting condition is established based on whether the power requirement exceeds a second starting determination threshold, the first starting determination threshold is different from the second starting determination threshold so that the first starting condition makes it less likely to restart the engine than the second starting condition.

10. The method according to claim 9, further comprising setting a torque change rate of driven wheels of the vehicle to a value no greater than a predetermined value when the engine is started on the basis of the first starting condition.

11. The method according to claim 9, further comprising:

detecting a speed of the vehicle; and restarting the engine on the basis of the first starting condition when the detected shift position is a running position and the detected vehicle speed is equal to or smaller than a predetermined value.

12. The method according to claim 11, further comprising:

setting a torque change rate of driven wheels of the vehicle to a predetermined value or less when the engine is started on the basis of the first starting condition.

13. The method according to claim 9, further comprising:

prohibiting the engine from being stopped even upon fulfillment of the stopping condition when the detected shift position is a backward position.

14. The method according to claim 13, further comprising:

counting an elapsed time after the switching of the shift position to the backward position; and prohibiting the engine from being stopped when the elapsed time is equal to or greater than a predetermined value.

15. The method according to claim 9, wherein:

the non-running position includes a neutral position and a parking position.

* * * * *